United States Patent [19]

Tenn

[11] Patent Number: 4,562,080
[45] Date of Patent: Dec. 31, 1985

[54] FRUIT FILLER FOR PASTRY PRODUCTS AND PROCESS FOR ITS PREPARATION

[75] Inventor: Faozy E. Tenn, Patterson, N.J.

[73] Assignee: Nabisco Brands, Inc., Parsippany, N.J.

[21] Appl. No.: 634,767

[22] Filed: Jul. 26, 1984

[51] Int. Cl.[4] .................. A21D 13/00; A21D 13/08; A23G 3/00

[52] U.S. Cl. ...................................... 426/94; 426/102; 426/103; 426/577; 426/578; 426/658; 426/496

[58] Field of Search ................ 426/94, 102, 573, 575, 426/496, 578, 658, 577, 103

[56] References Cited

U.S. PATENT DOCUMENTS

| | | | |
|---|---|---|---|
| 2,059,541 | 11/1936 | Thompson et al. | 99/132 |
| 2,359,228 | 9/1944 | Lloyd et al. | 99/139 |
| 3,656,967 | 4/1972 | Barton et al. | 426/275 |
| 3,676,151 | 7/1972 | Scharschmidt | 99/86 |
| 3,833,741 | 9/1974 | Katz et al. | 426/94 |
| 3,867,560 | 2/1975 | Menzi et al. | 426/350 |
| 3,892,871 | 7/1975 | Cooper | 426/573 |
| 4,234,611 | 11/1980 | Kahn et al. | 425/321 |
| 4,313,967 | 2/1982 | Kahn et al. | 426/327 |
| 4,387,109 | 6/1983 | Kahn et al. | 426/321 |
| 4,390,550 | 6/1983 | Kahn et al. | 426/102 |

OTHER PUBLICATIONS

Arnow, L. Earle, "Introduction to Physiological and Pathological Chemistry", The C. V. Mosby Company, (1961), p. 250.

DeMan, John M., "Principles of Food Chemistry", The AVI Publishing Company Inc., (1980) pp. 163 and 164.

*Primary Examiner*—Jeanette M. Hunter
*Attorney, Agent, or Firm*—Richard Kornutik

[57] ABSTRACT

A fruit filling, for use in pastry products, prepared by using critical proportions of apple powder, pregelatinized tapioca starch, corn syrup containing at least 70 percent of high fructose solids, and concentrated fruit juice or concentrated fruit puree. The fruit filling is prepared in the absence of heat. Little or no granular sugars are added to the filler.

30 Claims, No Drawings

FRUIT FILLER FOR PASTRY PRODUCTS AND PROCESS FOR ITS PREPARATION

BACKGROUND OF THE INVENTION

1. Field of the Invention

The invention relates to heat-stable fruit fillings for pastry products and to pastry products containing such fruit fillings. The invention also relates to a process for preparing such fruit fillings.

2. Prior Art

Fruit fillings or flavored jellies incorporated into pastry doughs are well known in the art. For example, U.S. Pat. No. 3,676,151 (Scharschmidt) is an example of a disclosure of a fruit filling designed to be incorporated into a dough. The dough is then oven baked. The finished product is stored until ready for use, at which time it is placed in a toaster. A difficulty with such product is that its filler is not heat-stable. If the pastry dough is not adequately sealed, the filler has a tendency to run out when heated thus playing havoc with the toaster, to say nothing of the loss of the filler. Such patent teaches the use of a combination of apple powder and invert syrup, which is a mixture of dextrose and fructose, but the proportions are low. Such patent also uses a high percentage of granular sugar. U.S. Pat. No. 3,833,741 (Katz et al.) teaches the production of a heat-stable filling by production of a two-phase filling, that is, a disperse phase of relatively small fat globules suspended in a polar matrix composed of protein, water and a mono or disaccharide. Heat coagulable proteins, such as, soy, and even gelatin are used as a heat stabilizing ingredient—such patent asserts having produced a filler that resists flow upon being heated. The process of preparation for such a filling requires the application of considerable external heat. For example, in a typical preparation, the mixture is heated to 110° to 120° F. The heat is necessitated because such patent uses a considerable portion of fat in its preparation.

U.S. Pat. No. 3,892,871 (Cooper) discloses that a superior jelly can be produced by the use of a corn syrup having a high fructose content with substantially no other sugar present except that derived from corn syrup. The jellies are made from corn syrup containing at least 15 percent of high fructose corn syrup, a natural fruit flavor, pectin (or modified pectin) and an acidifying agent. Pectin is a gelling agent. In the examples, the ratio of high fructose corn syrup (71 percent solids) to pectin is as high as 59.2 (or more) to one. However, such patent teaches the use of pectin, e.g., apple pectin, rather than apple powder as such. Additionally, such patent uses heat under vacuum to produce the gelling effect.

U.S. Pat. No. 3,867,560 (Menzi et al.) teaches dietetic confectioneries that are prepared from an aqueous homogeneous paste prepared from a mixture containing at least one assimilable carbohydrate selected from the group consisting of monosaccharides and oligosaccharides (in a proportion of from 35 to 60 percent by weight), at least one assimilable protein material soluble or dispersible in an aqueous medium of a pH between 6.2 and 7.2 (in a proportion of between 1 to 45 percent by weight), at least one gelling agent which is a gelling protein and a gelling carbohydrate, and between 4 and 24 percent by weight of water. The gelling agent contains at least 70 percent by weight of non-assimilable material. The entire amount of the gelling agent in the entire quantity of the mixture is between 12 and 20 percent by weight. Menzi et al. teaches the use of a high fructose corn syrup as the assimilable carbohydrate. In one embodiment, the mixture can contain 12 to 40 weight percent of the gelling agent and a powdery vegetable cellulose material, such as, apple marc. In the examples, the paste (used for the dietetic confectioneries) has a maximum ratio of fructose (as a syrup containing 70 percent by weight of dry materials) to apple marc powder of 1.89 to 1. An important ingredient of the patent product is a foamable protein, or else the mixture is preferably heated to 85° to 100° C.

U.S. Pat. No. 4,234,611 (Kahn et al.) discloses one of the more recent products adapted for a wide variety of uses including pastry filling. While such patent teaches a high fructose syrup and apples, it does not preclude the use of granular sugars or fat. The apples appear to be used solely as a fruit source. Starch is also an ingredient and the essence of the invention of such patent appears to be the production of a microbiologically stable food which can be kept at freezer or room temperature for extended periods. The application of heat is necessary in the preparation of such fillers.

U.S. Pat. No. 4,390,550 (Kahn et al.) teaches the production of fruit which is added to cereal. The fruit is first treated with sugar solution to remove part of the water thereof and then treated with a bath containing sugar solutes and a high fructose corn syrup. The examples teach apple pie fillings containing, among other things, dextrose-fructose syrup and frozen sliced apples. Example 4 discloses an apple donut filling containing, among other things, 11.40 parts of dehydrated apple pieces and 50.36 parts of dextrose-fructose syrup. The filling was cooked at 195° F. for 5 to 10 minutes.

U.S. Pat. No. 4,387,109 (Kahn et al.) discloses oil-in-water emulsion foods which are best stored in a frozen state. Fructose is incorporated into the food to minimize crystallization at low temperatures. Along the same lines see U.S. Pat. No. 4,313,967 (Kahn et al.).

U.S. Pat. No. 2,359,228 (Lloyd et al.) discloses a cream filling for baked goods using a non-crystalline dried corn syrup which mainly contains dextrose, maltose and dextrines.

U.S. Pat. No. 2,059,541 (Thompson et al.) discloses jelly preparations for confectioners' products. The jelly preparations include pectin and acid constituents plus cane sugar, fruit pulp and glucose or invert sugar. Some of the preparations include corn syrup at a level less than the pectin level. The preparations are cooked at a temperature above the boiling point of water.

Pectins yield galactose, arabinose, and a sugar acid (galacturonic acid) upon hydrolysis. They are present in fruits and berries. In the presence of sucrose and small amounts of acids they form jellies. Thus there are three probable causes for failure of a jelly to gel: (1) insufficient pectin; (2) insufficient acid (usually sufficient acid is present in the fruit); or (3) insufficient sucrose. The concentration of sucrose is increased in jelly making by boiling off a portion of the water present. The concentration of pectin can be increased by adding a commercial solution of that substance. See Arnow, L. Earle, "Introduction To Physiological And Pathological Chemistry," The C. V. Mosby Company, (1961), p. 250.

DeMan, John M., "Principles Of Food Chemistry," The Avi Publishing Company, Inc., (1980), pp. 163 and 164, deals with pectin. Pectic substances are polymers of 1 to 4 linked- galacturonic acid existing in different degrees of esterification or neutralization. In addition pectin contains branched L-arabinan and 1 to 4 linked β-D-galactan. Two factors are of great importance in determining the properties of pectins, especially gel formation: these are chain length and degree of esterification. Completely esterified pectins would have 16 percent of methoxyl content but do not occur in nature; the usual range is 9 to 12 percent of ester methoxyl, although some pectins may have a very low methyl content. When the methyl ester group is removed by alkaline hydrolysis or enzyme action a number of intermediates named pectinic acids are formed. When all of the methyl groups are removed the product becomes insoluble and is called pectic acid. Pectin is thus only a generic name for a range of products of widely differing composition which can be classified as pectinic acids. Pectins are used widely because of the excellent gel formation ability in acidsugar medium. Pectin molecules are not straight but coiled and there is less hydrogen bonding than in linear polymers like cellulose. To form a pectin gel a dehydrating agent must be present, usually sugar, and the proper amount of acid should be added. The best gel formation is obtained with pectins in which the methoxyl level has been reduced to about 8 percent. Pectins are evaluated for industrial use by pectin grades. These are the number of parts of sugar that one part of pectin will gel to acceptable firmness. Usual conditions are pH 3.2 to 3.5, sugar 65 to 70 percent and pectin 0.2 to 1.5 percent. Commercial grades vary from 100 to 500. Rapid set pectin has a degree of methoxylation of 70 percent or higher. This type will form gels with sugar and acid at pH optimum of 3.0 to 3.4. Slow set pectin has a degree methoxylation of 50 to 70 percent and forms gels with sugar and acid at pH optimum of 2.8 to 3.2 and at lower temperature than rapid set pectin. Low methoxyl pectins have methoxylation levels of less than 50 percent and do not form gels with sugar and acid but they will gel with calcium ions.

BROAD DESCRIPTION OF THE INVENTION

An object of the invention is to provide a heat-stable fruit filling for use in pastry products, particularly toasters. Another object of the invention is to provide a process for preparing such fruit filling. A further object of the invention is to provide a process for preparing such fruit filling without the applicaton of heat. A still further object of the invention is to provide pastry products, particularly toaster products, containing such fruit fillings. Other objects and advantages of the invention are set out herein or are obvious herefrom to one ordinarily skilled in the art.

The objects and advantages of the invention are achieved by the fruit filling, method and pastry products of the invention. The prior art apparently does not recognize or teach the beneficial properties and features of the invention.

The invention includes an edible heat-stable fruit filling for incorporation within a pastry dough sheath. The fruit filling includes about 60 to about 76 weight percent of corn syrup containing a substantial amount of fructose, about 10 to about 18 weight percent of apple powder, about 2 to about 7 weight percent of pregelatinized tapioca starch, and the remainder being at least one fruit in concentrated juice or concentrated puree form. All of the above-mentioned ingredients are critical to the invention. The weight ratios of the corn syrup, apple powder, pregelatinized tapioca starch and fruit are critical, and have values which provide heat resistance to the fruit filling and which provide stability to the filling. Also, the soluble solids range is critical to the invention. The apple powder provides heat resistance to the filling. The use of too much apple powder makes the product dry. The more apple that is used, the better baking performance that is obtained (but the high levels of apple powder dry out the product). If too much corn syrup is present, it will boil out during the cooking or baking of the pastry with some of it going into the dough sheath. The best results are obtained with a combination of a high fructose corn syrup and a corn syrup having a high dextrose equivalent value. The corn syrups provide stability and the correct water activity for the filling. If too much corn syryps are present, the other ingredients being constant, the corn syrups will boil out during the baking of the pastry with some of it going into the dough sheath. The functions and advantages of each ingredient are discussed into detail below. The fruit filling can be prepared without the application of heat.

The weight ratio of corn syrup to apple powder in the fruit filler is between about 3 to 1 and about 7 to 1. Preferably the weight ratio of the corn syrup to the apple powder is between about 4.5 to 1 and about 6.5 to 1. Preferably the corn syrup is present in the form of a corn syrup containing at least 70 percent of fructose (solids). Most preferably the corn syrup is a combination of a high fructose corn syrup and a corn syrup having a high dextrose equivalent (DE) value. Also preferably about 63 to about 74 weight percent of corn syrup and about 11 to about 15 weight percent of apple powder are present. Preferably the apple powder has a particle size of 20 mesh (i.e. 100 percent thereof passing through a number 2 mesh sieve of the U.S. Standard series). Preferably about 10 to about 50 weight percent of the concentrated fruit juice or concentrated puree are present.

Another important feature of the invention is that there must be substantially no granular or crystalline sugars used. The presence of granular sugars (e.g., sucrose) is determined to the invention because they tend to crystallize, giving the fruit fillings a grainy taste, as well as affecting the taste, appearance and mouthfeel. Furthermore, corn syrup is cheaper than ordinary sugars. Granular sugars are also detrimental because a high sucrose content will tend to boil out when cooked or baked. Preferably no granular sugar is used, but up to 5 percent by weight can be used (based on the total weight of the filling). Boiling out of sugar or any other ingredient breaks or puffs up the dough and the boiled-out ingredients tend to go into the dough.

Non-granular sugars, besides fructose, can be present in the fruit fillings.

It is important that the fruit filling has a moisture content of about 22 to about 25 weight percent of water. The moisture level is a critical factor in the invention fruit filling.

The fruit component can be, for example, grape, strawberry, raspberry, cherry, peach, apple, crabapple, gooseberry, cranberry, pineapple, blackberry, orange, lemon, lime, grapefruit or guava in contentrated juice or concentrated puree form. Dried fruits cannot be used as the fruit component.

All of the ingredients of the invention fruit fillings contribute to the total soluble solids content and total water content. The soluble solids content is 73 to 80 percent and preferably is 75 to 78 percent.

The invention fruit fillings have acceptable flavor, are not grainy, good texture and good overall eating qualities. The invention fruit fillings also have good appearance and pleasant "mouth feel". The invention fruit fillings are stable upon storage, having a good shelf life at room temperature and even higher temperatures, and are mold-resistant and otherwise microbiologically stable. The sugar level prevents mold growth. The fruit fillings do not have to be frozen or refrigerated during storage.

The invention fruit fillings are readily and easily made by an economical method without the need to apply external heat. The invention fruit fillings are economical and easy to make. Also, their processing involves great savings of fuel and electricity.

The fruit component of the invention fillings can be replaced with a combination of brown sugar and cinnamon to provide a brown sugar, cinnamon filler for pastries. Granulated sugar is normally not used in the invention fruit fillings. But granulated sugar is always used in the brown sugar, cinnamon filling up to a maximum of 5 weight percent. The reason is that brown sugar by legal definition has a ratio of 10 parts of brown sugar molasses to 100 parts of granulated sugar. Preferably not more than 3.8 weight percent of granulated sugar is used in the invention brown sugar, cinnamon fillings. Levels of granulated sugar above the preferred percentage will not readily go into solution during mixing in the room temperature preparation process and consequently will boil out during baking.

The invention also involves a process for preparing an edible heat-stable fruit filling for inclusion within a pastry dough sheath. The process includes admixing about 60 to about 76 weight percent of corn syrup about 10 to about 18 weight percent of apple powder, about 2 to about 7 weight percent of pregelatinized tapioca starch, and the remainder being at least one fruit in concentrated juice or concentrated puree form. The weight ratios of the corn syrup, apple powder, fruit and pregelatinized tapioca starch are critical and are such as to provide heat resistance to the fruit filling and to provide stability to the filling. The admixing is done by a cold working process, i.e., the admixing step is conducted without the application of heat. The fruit filling is prepared with the absence of the addition of external heat. (Apple pectin has to be heated to 225° F. in order to melt it.) The sequence of addition of the ingredients is not critical, although advantages are obtained by using certain addition and mixing sequences.

In a preferred embodiment, the apple powder and pregelatinized tapioca starch are blended with any other solids that are added and then high fructose corn syrup and corn syrup having a high dextrose equivalent value as well as any other liquids are added. The combination is then mixed with a low shear agitator for an adequate time to produce a well dispersed mix and without the application of any external heat energy. A quite simplified preparation procedure is thereby provided.

The components of the invention fruit filling are commercially available and reasonably priced. The manufacturing technique is simple, efficient, rapid, economical and troublefree, so that reproducible batches of fruit filling can be made without the need for extensive processing or for expensive equipment. Simple mixing for a substantially short period of time without the application of heat will produce an excellent filling for pastry doughs.

In the process embodiment of the invention, the fruit component can be replaced with brown sugar and cinnamon. As brown sugar is a combination of granulated sugar and brown sugar molasses, preferably the former is dry admixed with the other solids and then the latter is admixed in with the other liquids.

The invention further involves a cooked pastry product containing an edible heat-stable fruit filling. The cooked pastry product includes a cooked pastry sheath having a cereal flour base and an edible heat-stable fruit filling contained within the cooked pastry sheath. The edible heat-stable fruit filling includes about 60 to about 76 weight percent of corn syrup, about 10 to about 18 weight percent of apple powder, about 2 to about 7 weight percent of pregelatinized tapioca starch, and the remainder being at least one fruit used in concentrated juice or concentrated puree form. The weight ratio of the corn syrup, apple powder, fruit and pregelatinized tapioca starch are critical and is such as to provide heat resistance to the fruit filling and to provide stability to the filling. The invention fruit filling is designed to be compatible with the dough in which it is to be encased. A high amount of the invention filler can be used without boiling out of the product during cooking or baking.

The cooked pastry product should have an equilibrium relative humidity of 70 percent or less. The cooked pastry product should have a moisture content of about 10 to about 14 weight percent of water. The pastry product does not readily dry out.

The fruit fillings have sufficient consistency and body (i.e., high resistance to flow) during the heating or baking of the pastries so that they do not run if the pastries have holes therein or are not entirely sealed.

The invention cooked pastry products containing the fruit fillings of the invention, when packaged in air-tight or hermetically-sealed packaging, have excellent long-term stability (e.g., six months stability). Often the pastry products are baked at the factory, and then the consumer can eat the pastry product cold or first reheats or toasts it.

In the cooked pastry product embodiment of the invention, the fruit component in filling can be replaced with brown sugar and cinnamon.

The invention involves a toaster product adapted to be packaged in a substantially moisture-proof and air-tight package. The toaster product has storage stability of six months or longer. The fruit-filled dough product includes a continuous dough crust containing therein an edible heat-stable fruit filling. The fruit filling includes about 60 to about 76 weight percent of corn syrup, about 10 to about 18 weight percent of apple powder, about 2 to about 7 weight percent of pregelatinized tapioca starch, and the remainder being at least one fruit used in concentrated juice or concentrated puree form. The weight ratios of the corn syrup, apple powder, fruit and pregelatinized tapioca starch are critical and are such as to provide heat resistance to the fruit filling and to provide stability to the filling. Usually the toaster product is baked in the production facility, and then the consumer can eat the toaster product cold or first reheats or toasts it.

The toaster product must have an equilibrium relative humidity of 70 percent or less. The toaster product should have a moisture content of about 10 to about 13 weight percent of water. The toaster product does not easily dry out.

In the toaster product of the invention, the fruit component in the filling can be replaced with brown sugar and cinnamon.

DETAILED DESCRIPTION OF THE INVENTION

The fruit filling of the invention contains from about 10 to about 18 weight percent, based on the total weight of the fruit filling, of apple powder, and preferably about 13 to about 15 weight percent of apple powder. At levels greater than 15 percent, apple flavor tends to predominate and is undesirable if non-apple fruits or fruit flavors are desired. However, in the case of grape flavor it is possible to employ an apple powder at levels as high as 20 percent. Where apple is the fruit component, apple powder is still used to impart the invention properties to the fruit filling. Preferably, the apple powder employed has a particle size of 100 percent through a No. 20 U. S. Standard Mesh Screen. Smaller or coarser particle sizes can be employed. Among other things, the apple powder serves to absorb moisture, acts as a binder or stabilizer and gives a desired fruity flavor. Without the presence of apple powder to reduce the level of the pregelatinized starch in the fruit fillings, the product would be gummy and rubbery and would lack the desired textural characteristics. When apple powder is present, the usage of starch is minimized. The presence of the apple powder and the means that there is no migration of the filling into the dough portion of the product.

The apple powder serves also to absorb moisture, acts as a water binder, enables the filler to be soft and smooth, and inhibits migration of the filler into the dough. The apple powder has a lot of fiber. Water absorption of starch is high and the starch will swell, so apple powder is used as it does not swell as much when it absorbs water. An all starch fruit filler would be too gummy, so apple powder is used to help reduce the level of starch that would be needed if no apple powder was used. Apple powder is not as gummy as starch at the low temperatures used in the invention process. Unbaked starch will swell after baking due to water absorption, so the amount of starch used should be minimized and controlled.

The apple powder usually has a particle size between 16 mesh and 20 mesh (i.e., it passes through such a screen in the U.S. Screen Series), preferably 20 mesh. It is not necessary that the apple powder be completely dry when it is used.

Apple powder contains pectin (pectinuous materials). Apples as such contain 5 to 7 percent of pectin.

Apples freshly harvested in autumn have a strong middle lamella; when bitten into the cell walls break and the apple feels juicy. The middle lamella weakens during storage due to degradation of the pectic substances; an apple that has been stored for six months breaks through the middle lamella when bitten giving the sensation of dry, slightly abrasive cells and little juiciness even through the moisture content is the same as the juicy apple eaten in autumn.

In fruits in general, the changes in the chemical nature of the pectic materials are the primary cause of changes that occur in the textural properties of fruits. In green fruits the pectic material is principally in the form of partially esterified polygalacturonic acid of very high molecular weight called protopectin. This is the generic name given to the water-insoluble pectic substances. It imparts great strength to the tissue. As the fruit ripens, the chain length of the pectin polymer decreases forming water-soluble pectin, which is not as strong as the protopectin, and the structure becomes increasingly soft and eventually mushy. The changes in pectin are caused by two groups of enzymes: (a) pectin methylesterases which catalyze the deesterification of pectin, yielding free polygalacturonic acid and methanol; and (b) polygalacturonases which catalyze the splitting of the 1,4 glycosidic bonds of the pectin molecule.

Heat also promotes the depolymerization of the pectin resulting in the great degree of softening that accompanies the cooking of fruits.

Much of the focus of the prior art is on the use of pectin, but pectin does not provide the advantages obtained in the invention by the use of apple powder.

Fruit fillers have a boiling problem, but the invention has provided a cure. The invention fruit fillers lowered the sugar content without loss of product preservation and raised the apple powder and pregelatinized tapioca starch content to increase product heat stability.

The invention fruit filling contains from about 60 to about 76 weight percent, based on the total weight of the fruit filling, of corn syrup containing a substantial amount of fructose, and preferably about 63 to 74 weight percent of such corn syrup. The corn syrup provides the required properties in the fruit filler and product, and cannot be replaced merely by fructose in water. Most preferably a combination of high dextrose equivalent (DE) corn syrup and high fructose corn syrup (HGCS) is used as the corn syrup. Although high DE corn syrup or HFCS can be by itself, invert sugar could be used, but it is relatively very expensive.

High fructose corn cyrup usually contains from about 42 to about 90 percent of fructose. Preferably a high fructose corn syrup (HECS) having at least 70 percent by weight of solids is used. There are advantages in the use of the higher fructose syrups. One advantage is the gain in total soluble solids because of the higher solubility of fructose when compared with dextrose (which is a major component of corn syrup). HFCS is quite concentrated. The high fructose corn syrups are normally manufactured by a multiple enzyme process which increases the fructose content of the syrup to a substantial level. Such high fructose corn syrups normally have a solids content of from 65 to 75 percent, a moisture content of 25 to 35 percent, a pH of 4 to 4.8, a density of 10.5 to 11.5 lbs./gallon at 100° F. and a solids content of 7.5 to 8.2 lbs./gallon at 100° F. Use of high fructose corn syrup produces a very tasty product of good textural quality and without graniness.

The corn syrup provides soluble solids which help with filler preservation. The most important factor in filler preservation is to have a high solids content. (Secondarily preservatives can be added.) The fructose in the corn syrup is in the form of soluble solids and will not crystallize out of the filler or boil out of the pastry unless too much of it is present. Advantageously no water is added to the fruit filler formation.

In the most preferred version, the ratio used of corn syrup to high fructose corn syrup provides sweetness and economics of production, provides a humectant and allows the desired degree of browning of the pastry during baking. The combined level of dextrose and fructose in the combination of corn syrup and high fructose corn syrup provides stability against microorganisms.

Corn syrup is a rather viscous syrupy liquid which is a mixture of dextrose, maltose and dextrin, with about 20 percent of water. Normally, such a syrup will have a solids content of 75 to 84 percent, a moisture content of 15 to 30 percent, a pH of 4.2 to 5.2 and a density at 100°

F. of about 11 to 12 lbs./gallon. The carbohydrate components of such a corn syrup will usually be 30 to 50 percent of monosaccharides (dextrose), 20 to 40 percent of disaccharides (maltose), and 10 to 20 percent of other saccharides, e.g., 2 to 6 percent of tetrasaccharides, 2 to 10 percent of pentasaccharides, 1 to 4 percent of hexasaccharides and 5 to 15 percent of higher saccharides. The dextrose equivalent of the corn syrup will normally be from 55 to 70 percent and the ash content (sulfated) will be from 0.1 to 1 percent. Such a corn syrup is usually made by a dual or acid-enzyme process. Acid-converted corn syrups can also be employed. Higher D.E. values are provide better stability or E.R.H. for the product.

Corn syrup provides a source of non-granular sugar and preferably is present in an amount of 63 to 74 weight percent based on the fruit filling.

Little of no sucrose (crystalline or granulated sugar) should be added as such to the fruit filling compositions of the invention.

The heat-stable fruit filling includes about 60 to about 76 weight percent of corn syrup, about 10 to about 18 weight percent of apple powder, about 2 to about 7 weight percent of pregelatinized tapioca starch, and the remainder being at least one fruit used in concentrated juice or concentrated puree form. All of such ingredients are critical to the invention. The weight ratio of the corn syrup, apple powder, fruit and pregelatinized tapioca starch are critical and are such as to provide stability to the filling.

Concerning the ratio of apple powder to the combination of corn syrup, if too much of the combination is used, say to produce a total solids content of more than 80 percent, the sugar will crystallize out, and if too little of the combination is used, say a total solids content of less than 70 percent, the water activity or E.R.H. becomes too high and the product becomes moldy.

The fruit (in the form of a concentrated juice or concentrated puree) is included in the fruit filling at a level of about 1 to about 12 weight percent, based on the total weight of the fruit filling, and preferably at a level of about 2 to about 10 weight percent.

The fruit component can be, for example: aggregate fruits, such as, raspberries, blackberries, boysenberries and dewberries; pome fruits, such as, apples, pears and quinces; vine fruits, such as, grapes; stone fruits, such as, peaches, plums, and cherries; false berry fruits, such as, cranberries, gooseberries, and blueberries; multiple fruits, such as, pineapples, and mulberries; fleshy receptacle fruits, such as, strawberries; and citrus fruits, such as, oranges, limes, grapefruits and tangerines. The fruit component can be used in the form of, for example, concentrated fruit, fruit pulp and fruit puree. Figs, currants, dates and raisins are not used in the invention because they have the fiber content and do not need any added starch.

Dried fruits cannot be used as the fruit component.

All of the ingredients of the invention fruit fillings contribute to the total soluble solids content and total water content. The soluble solids content is 73 to 80 percent and preferably is 75 to 78 percent.

The invention fruit fillings are heat-stable and have acceptable flavor, texture and overall eating qualities.

The invention fruit fillings should have an equilibrium relative humidity (ERH) of 70 percent or less to insure storage stability therefor. The moisture content of the invention fruit fillings should be 22 to 25 weight percent of water. Products having higher moisture contents are not acceptable because of possible storage stability problems, such as, browning and bacterial decomposition. High moisture levels are accompanied by mold growth.

In addition to the materials, which play an essential part in the composition of the fruit filling, the fruit filling can contain other materials designed to play various secondary roles. The mixture can contain a material designed to check the propagation of microbes, for example, sorbic acid or potassium sorbate. The mixture can also contain at least one edible acid, for example, citric acid or lactic acid, to reduce its pH for the purpose of improving the preservative capability of the product. The mixture can further contain at least one substance (humectant) having a great affinity to water, for example, glycerin or sorbitol, designed to maintain the moisture content of the product constant plus mineral salts (such as, sodium chloride usually present at about 0.4 weight percent), flavors and food dyes.

Protein materials, such as, soya protein powder, are not used because they absorb the water which cause the fruit filler to be too dry.

The acidifying agent can be at least one organic acid, such as, citric acid (preferred), malic acid, tartaric acid, fumaric acid, glacturonic acid, ascorbic acid, saccharic acid, lactic acid, and acetic acid, at least one inorganic acid, such as, phosphoric acid, and carbonic acid, and mixture thereof. (Preferably citric acid is used at a level of about 0.4 percent.) Buffers can also be present.

The natural or synthetic flavorants can be, for example, mint, strawberry, grape, pineapple, vanilla, cream, spice, maple, chocolate, butter, caramel, coffee, cinnamon and lemon flavorings.

Usually 3 to 5 percent by weight of at least one humectant is used.

Preservatives, such as, sodium benzoate and potassium sorbate, can be used in the fruit fillings. Usually 0.01 to 0.1 percent by weight of at least one preservative is used. The sugar level in the fruit helps prevent mold growth.

Glycerin is a useful humectant, but inclusion of too much of it cause a bad taste.

Other ingredients known to those skilled in the art may also be employed to impart their characteristic effects to the fruit filling of the invention. It is best that fat is not used in the fruit fillings.

The fruit component of the invention fillings can be replaced with a combination of brown sugar and cinnamon to provide a brown sugar, cinnamon filler for pastries. Granulated sugar is normally not used in the fruit fillings. But granulated sugar is always used in the brown sugar, cinnamon filling up to a maximum of 5 weight percent. The reason is that brown sugar has a ratio of 10 parts of brown sugar molasses to 100 parts of granulated sugar. Preferably not more than 3.8 weight of sucrose is used in the invention fruit fillings or the invention brown sugar, cinnamon fillings. Levels of granulated sugar above that level tend to boil out during baking and will not go into solution during mixing in the room temperature preparation process.

Brown sugar cinnamon filler formulations were troublesome, but the invention solved the problem by adding apple powder. Some starch can be used as a carrier for the brown sugar flavor (which is very powdery and easily cakes up, when it is used without a carrier, the moment it contacts the wet admixture).

From the description of the invention process it is seen that equipment employed is simple and the process can be carried out rapidly, therby greatly increasing the efficiency of the manufacturing operation and allowing production of more fruit filling from the same equipment and with little plant floor spaced required.

The pastries containing the invention fruit filling can be prepared by any suitable or conventional technique or method. The pastries and baked products are, for example, pies, donuts, coffee cakes, waters (and other sandwich cookies), muffins, breads, biscuits, cookies and related food items. The fruit fillings are normally inserted in the pastries before the latter are cooked or baked. The invention pastries are flour based bakery product comprising a baked crumb structure having a cereal flour base and a solid fabricated flavored food filling contained therein.

The doughs for the pastries can be any suitable or conventional pastry dough or baked product dough. For example, the dough used to prepare the pastry crust can be formulated according to any of the standard recipes and generally contains about 10 to 15 percent of fat, about 5 to 15 percent of sucrose, about 40 to 60 percent of flour and has a moisture content of about 10 to 25 percent. The dough also contains about 1 to 10 percent humectant, about ½ to 2 percent leavening and other optional ingredients such as 0 to about 7 percent of non-fat milk solids, 0 to about 4 percent of active dry yeast and 0 to about 1½ percent of salt. Such percentages are all based on the weight of the unbaked dough.

The fat or shortening employed in the dough ma be any shortening, although it is preferred to employ a plastic-type shortening. Liquid shortenings may also be employed. The humectant employed in the dough may be any humectant which does not impart a stickiness or off-flavor to the final product. Glycerin, sorbitol, corn syrup and like humectants may be employed. The flour employed in the dough may be either hard or soft white wheat flour. When hard wheat flour is employed it may be treated with a proteolytic enzyme in order to obtain the most desired texture and a longer shelf life. It is best to employ an unbleached flour product. A preservative may be employed in the dough to prevent mold growth in order to extend the shelf life of the final product. Typical preservatives would be sorbic acid, sodium propionate or combinations thereof. Such preservatives would be used at such level as is required to prevent mold growth. A typical leavening system would be sodium aluminum phosphate and sodium bicarbonate in a ratio of 1:1, or monocalcium phosphate and sodium bicarbonate in a ratio of 2:1. However, any commercial baking powder may be employed as the leavening system in the present invention. The dough will also contain sufficient water to maintain a moisture content of 20 to 35 percent and preferably 25 to 30 percent prior to processing into the pastry product.

The fruit filling, for example, is deposited on a dough surface and then covered with a top sheet of dough, which is already punctured with steam escape holes. All of the edges are then sealed by crimping the dough edge to provide the necessary seal. While any size fruit-filling product may be prepared, it is preferred in order that the product be used as a toaster product, that it have dimensions of 4½ inches by 3 1/32 inches. The fruit filling will preferably have a thickness of 1/16 to ⅛ inch, and most preferably ⅛ inch, although other thicknesses can be employed.

Typically, the product after the dough edges have been sealed is baked at a temperature of 300° to 400° F. for 12 to 5 minutes. Preferably a temperature range of 350° F. for 10 minutes to 375° F. for 6 minutes is employed during baking. The product can then be dried if the moisture content is greater than 10 to 13 percent after baking. Drying can be carried out using forced hot or cold air. Static air drying can also be employed with controlled humidity. Where hot air is employed, it should be at a temperature of less than 225° F. It is also possible to use temperatures greater than 225° F. provided such temperatures do not increase the degree of brownness in the product—fructose is susceptible to the browning reaction upon excessive heating. The product after drying is cooled to prevent sweating in the package and then is packaged in a moisture-proof package.

Preferably the moisture content of the packaged product is about 10 to about 13 percent.

Accelerated and long term storage tests of cooked pastry products containing the fruit fillings of the invention showed that such cooked pastry products, when packaged in airtight packaging, had excellent long-term storage stability. Cellophane and other enwrapments can be used to provide airtight packaging.

The water activity of a food is defined as the partial pressure of water in the food divided by the saturation pressure of water at the temperature of the food. The water activity can be determined by placing a sample in a container which is then sealed, and after equilibrium is reached, determining the relative humidity above the sample.

Several mathematical methods are available for calculating water activity, even of formulations containing different solutes and with non-solutes. Rough calculations based on the additive effect of the number of moles of each component multiplied by the activity of the component are useful for estimating water activity. Such calculations reduce the number of experimental measurements that might otherwise be needed and thus assist in reaching a suitable formulation more quickly. A combination of mathematical techniques with trial and error experiments followed by analytical measurements for determining water activity will lead to acceptable results.

There are commercially available devices for measuring the water activity of formulations. For example, a formulation may be placed in a container until equilibrium is reached and then the humidity in the container is measured. The water activity is then determined through reference to standard tables. For example, electrical hygrometers are devices commonly used to measure water activity. These devices contain sensors impregnated with salts such as lithium chloride or potassium chloride. Water is adsorbed on the sensor and causes a change in electrical resistance which is measured by a wheatstone bridge. Reference curves based on solutions of known humidity are used to relate the electrical readings to water activity.

Fruit fillings that require heat in their preparation, besides being more expensive, have a number of disadvantages which are not possessed by the invention fruit fillings that use cold or non-heat preparation process. The hot-process fruit filling contains fine granulated sugar, apple, pectin, frozen bulking fruit, starch, locust bean gum and dextrose, which are not possessed by the invention fruit fillings that use a herein cold or non-heat process means that the process is conducted at room temperature. The hot-process fruit fillings use fine granulated sugar and pectin, which do not dissolve cold. The hot-process fruit fillings further use dextrose and locust bean gum, which also do not dissolve cold. The invention fruit filler uses a concentrated fruit material having 50 to 68 weight percent of solids—the cold preparation cannot get rid of excess added water. The hot-process fruit fillings uses frozen bulking fruit having 9 to 12 weight percent of solids with the remainder water. The hot-process is needed to melt and heat the frozen bulking fruit and the heat helps evaporate off some of the excess added water.

When an apple fruit filling is prepared, apple powder is used to provide oven stability and flavor. The apple fruit component is used in the form of concentrated apple juice, and not as a dry fruit. The apple fruit component is preferably added in the form of apple juice concentrate since it has a high solids content. Apple juice concentrate must be used in order not to have too much apple powder present, or else the filler would be too thick and the product would be too dry to eat. Apple colorant can be added if desired. Pregelatinized tapioca starch is used as a stabilizer for oven performance to prevent the filler from boiling out during cooking. Non-gelatinized starch is not used because it will make the product too dry, it absorbs too much water, it becomes too gummy and it needs heat to expand. Citric acid is used for its acid taste and flavor, supplies solids and helps to provide the acidic pH needed in fruit fillers. Citric acid also lessens the sweetness of the filler. Salt is added for taste and flavor, to provide a solid, for preserving the product and to lessen the sweetness. Preferably the corn syrup is a combination of corn syrup and high fructose corn syrup; such combination supplies the fructose, preserves the product, provides solids and provides sweetness. Glycerin is a humectant used to hold moisture during storage of the product. Glycerin particles also add solids content. The main preservative factor comes from the total soluble solids content. Sodium benzoate is added as a preservative and mold inhibitor and to provide solids.

When a non-apple fruit filler is prepared, apple powder is used to provide oven stability and not for flavor. The amount of apple powder should be less that which can be tasted. The non-apple fruit component is used in the form of concentrated non-apple fruit juice or concentrated non-apple puree, and not as a dry fruit. The non-apple fruit component is preferably added in the form of fruit juice concentrate, e.g., blueberry juice, since it has a high solids content. Non-apple juice concentrate, besides being used for flavor, must be used in order not to have too much apple powder present, or else the filler would be too thick and the product would be too dry to eat. Flavorants can be added if desired. Pregelatinized tapioca starch is used to help mask or minimize the apple taste and for oven performance to prevent the filler from boiling out during cooking. Non-gelatinized starch is not used because it will make the product too dry, it absorbs too much water, it becomes too gummy and it needs heat to expand. Citric acid is used for its acid taste and flavor, supplies solids and helps to provide the acidic pH needed in fruit fillers. Citric acid also lessens the sweetness of the filler. Salt is added for taste and flavor, to provide a solid, for preserving the product and to lessen the sweetness. Preferably the corn syrup is a combination of corn syrup and high fructose corn syrup; such combination supplies the fructose, preserves the product, provides solids and provides sweetness. Glycerin is a humectant used to take up moisture picked up by non-fully hydrated starch during product storage. Glycerin products also add to the solids content. Sodium benzoate is added as a preservative and to provide solids.

When a brown sugar cinnamon filler is prepared, apple powder is used to provide oven stability and not for flavor. The amount of apple powder should be less than that which can be tasted. Brown sugar molasses and granulated sugar, in the ratio of 1 to 10, is used. Brown sugar flavor can be added; cinnamon is added; and spices such as nutmeg can be added. Pregelatinized tapioca starch helps hold the product together. Non-gelatinized becomes too gummy as starch needs heat to swell. Citric acid is used for its acid taste and flavor, supplies solids, helps to provide an acidic pH and lessens the sweetness of the filler. Salt is added for taste and flavor, to provide a solid, for preserving the product and to lessen the sweetness. Preferably the corn syrup is a combination of corn syrup and high fructose corn syrup; such combination supplies the fructose, preserves the product, provides solids and provides sweetness. Glycerin is used to supply solids. Sodium benzoate is added as a preservative and mold inhibitor and to provide solids.

As used herein, all parts, percentages, ratios and proportions are on a weight basis unless otherwise stated herein or otherwise obvious herefrom to one ordinary skilled in the art.

EXAMPLE 1

The example illustrates the preparation of a brown sugar cinnamon pastry filling of the invention.

The following ingredients (Stage I) were placed in an upright low-shear mixer:

| Ingredients | Amounts |
| --- | --- |
| Apple Powder | 300 lbs. |
| Pregelatinized Tapioca Starch | 80 lbs. |
| Fine Granulated Sugar | 100 lbs. |
| Ground Cinnamon | 15 lbs. |
| Dough Salt | 12 lbs. 4 oz. |
| Citric Acid | 3 lbs. |
| Sodium Benzoate | 2 lbs. 8 oz. |

The mixture was mixed for 5 minutes. The following ingredients (Stage II) were separately dry blended.

| Ingredients | Amounts |
| --- | --- |
| Brown Sugar Flavor | 70 lbs. |
| Pregelatinized Tapioca Starch | 25 lbs. |

The ingredients (Stage II) were added to the mixer and mixed for 5 minutes. The following ingredients (Stage III) were added to the mixer:

| Ingredients | Amounts |
| --- | --- |
| High Dextrose Corn Syrup | 925 lbs. |
| High Fructose Corn Syrup | 915 lbs. |
| Glycerin | 100 lbs. |
| Brown Sugar Molasses | 10 lbs. |
| Water | 75 lbs. |

The mixture was mixed for 10 minutes to produce a uniform well-dispersed filling. All of the mixing was done at ambient temperature. The filling had a weight of 2,632 pounds 12 ounces. Before the filling was removed (dumped) from the mixer, the viscosity and the soluble solids of the filling were checked. As needed, the soluble solids content of the filling can be adjusted to 75 to 78 percent using corn and high fructose corn syrups. The viscosity of the filling was checked using a Bozwick viscometer. A viscosity of 6 to 10 is acceptable. The viscosity of the filling can be adjusted by increasing or decreasing the level of the pregelatinized tapioca starch. The filling was a heat-stable tasty filling having excellent texture, pleasant mouth-feel and superior preservative capability at normal room temperature and above. The filling had a moisture content of 23 weight percent.

The filling was put in a series of uncooked dough pastries as follows. Portions of the filling were placed on a dough sheet so that a dough margin was left around the perimeter of each filling portion. Then the first dough sheet and filling portions were covered with top sheet of dough, which was already punctured with steam escape holes. All of the dough edges were dealed by crimping the dough edges to provide the necessary seal. The uncooked pastries were cooked in an oven (with steam therein) at 365° F. for six minutes. The cooked pastries had a size of 4¼ inch in length, 3 1/32 inch in width and ⅜ inch in thickness, and had a count of 9¼ per pound. The cooked pastries had a water activity of 70 percent ERH maximum and a moisture content of 10 to 13 weight percent. The filling had acceptable flavor, texture and overall eating qualities.

After being air-tight packaged individually in a foil laminate, the cooked pastries were stored for six months. At the end of that period of time, the cooked pastries were still very edible and did not show any mold growth.

EXAMPLE 2

The Example illustrates the preparation of a cherry pastry filling of the invention.

The following ingredients (Stage I) were placed in an upright low-shear mixer.

| Ingredients | Amounts |
| --- | --- |
| Apple Powder | 315 lbs. |
| Pregelatinized Tapioca Starch | 140 lbs. |
| Dough Salt | 12 lbs. 4 oz. |
| Citric Acid | 14 lbs. 4 oz. |
| Sodium Benzoate | 2 lbs. 8 oz. |
| Red Food Color | 4 oz. |

The mixture was mixed for 5 minutes. The following ingredients (Stage II) were separately added:

| Ingredients | Amounts |
| --- | --- |
| High Dextrose Corn Syrup | 965 lbs. |
| High Fructose Corn Syrup | 785 lbs. |
| Concentrated Cherry Juice | 140 lbs. |
| Glycerin | 130 lbs. |
| Cherry Flavor | 50 lbs. |
| Caramel Color | 5 lbs. |

The mixture was mixed for 15 minutes. The filling had a weight of 2,559 pounds 4 ounces. Before the filling was removed from the mixer, the viscosity and the soluble solids of the filling were checked. As needed, the soluble solids content of the filling can be adjusted to 75 to 78 percent using corn and high fructose corn syrups. The viscosity of the filling was checked using a Bozwick viscometer. A viscosity of 6 to 10 is acceptable. The viscosity of the filling can be adjusted by increasing or decreasing the level of the pregelatinized tapioca starch. The filling was a heat stable tasty filling having excellent texture, pleasant mouth-feel and superior preservative capability at normal room temperature and above. The filling had a moisture content of 23 percent.

The filling was put in a series of uncooked dough pastries as follows. Portions of the filling were placed on dough sheet so that a dough margin was left around the perimeter of each filling portion. Then the bottom dough sheet and the filling portions were covered with a top sheet of dough, which was already punctured with steam escape holes. All of the dough edges were sealed by crimping the dough edges to provide the necessary seal. The uncooked pastries were cooked in an oven (with steam therein) at 365° F. for six minutes. The cooked pastries had a size of 4¼ inch in length, 3-1/32 inch in width and ⅜ inch in thickness, and had a count of 9¼ per pound. The cooked pastries had a water activity of 70 percent ERH maximum and a moisture content of 10 to 13 weight percent. The filling had acceptable flavor, texture and overall eating qualities.

After being air-tight packaged individually in a foil laminate, the cooked pastries were stored for six months. At the end of that period of time, the cooked pastries were still very edible and did not show any mold growth.

EXAMPLE 3

The Example illustrates the preparation of a strawberry pastry filling of the invention.

The following ingredients (Stage I) were placed in an upright low-shear mixer:

| Ingredients | Amounts |
| --- | --- |
| Apple Powder | 320 lbs. |
| Pregelatinized Tapioca Starch | 135 lbs. |
| Dough Salt | 12 lbs. 4 oz. |
| Citric Acid | 13 lbs. |
| Sodium Benzoate | 2 lbs. 8 oz. |
| Red Food Color | 4 oz. |

The mixture was mixed for 5 minutes. The following ingredients (Stage II) were separately added:

| Ingredients | Amounts |
| --- | --- |
| High Dextrose Corn Syrup | 975 lbs. |
| High Fructose Corn Syrup | 785 lbs. |
| Concentrated Strawberry Juice | 135 lbs. |
| Glycerin | 115 lbs. |
| Strawberry Flavor | 60 lbs. |
| Caramel Color | 5 lbs. |

The mixture was mixed for 15 minutes. The filling had a weight of 2,558 pounds. Before the filling was removed from the mixer, the viscosity and the soluble solids of the filling were checked. As needed, the soluble solids content of the filling can be adjusted to 75 to 78 percent using corn and high fructose corn syrups. The viscosity of the filling was checked using a Bozwick viscometer. A viscosity of 6 to 10 is acceptable. The viscosity of the filling can be adjusted by increasing or decreasing the level of the pregelatinized tapioca starch. The filling was a heat-stable tasty filling having excellent texture, pleasant mouth-feel and superior preservative capability at normal room temperature and above. The filling had a moisture content of 23 weight percent.

The fruit filling was put in a series of uncooked dough pastries as follows. Portions of the filling were placed on a dough sheet so that a dough margin was left around the perimeter of each filling portion. Then the bottom dough sheet and the filling portions were covered with a top sheet of dough, which was already punctured with steam escape holes. All of the dough edges were sealed by crimping the doubh edges to provide the necessary seal. The uncooked pastries were cooked in an oven (with steam therein) at 365° F. for six minutes. The cooked pastries had a size of 4¼ inch in length, 3-1/32 inch in width and ⅜ inch in thickness, and had a count of 9¼ per pound. The cooked pastries had a water activity of 70 percent ERH maximum and a moisture content of 10 to 13 weight percent. The filling had acceptable flavor, texture and overall eating qualities.

After being air-tight packaged individually in a foil laminate, the cooked pastries were stored for six months. At the end of that period of time, the cooked pastries were still very edible and did not show any mold growth.

EXAMPLE 4

The Example illustrates the preparation of a blueberry pastry filling of the invention.

The following ingredients (Stage I) were placed in an upright low-shear mixer:

| Ingredients | Amounts |
| --- | --- |
| Apple Powder | 325 lbs. |
| Pregelatinized Tapioca Starch | 140 lbs. |
| Dough Salt | 12 lbs. 4 oz. |
| Citric Acid | 13 lbs. |
| Sodium Benzoate | 2 lbs. 8 oz. |
| Red Food Color | 4 oz. |

The mixture was mixed for 5 minutes. The following ingredients (Stage II) were separately added:

| Ingredients | Amounts |
| --- | --- |
| High Dextrose Corn Syrup | 975 lbs. |
| High Fructose Corn Syrup | 740 lbs. |
| Concentrated Blueberry Juice | 180 lbs. |
| Glycerin | 120 lbs. |
| Blueberry Flavor | 40 lbs. |
| Caramel Color | 10 lbs. |

The mixture was mixed for 15 minutes. The filling had a weight of 2,558 pounds. Before the filling was removed from the mixer, the viscosity and the soluble solids of the filling were checked. As needed, the soluble solids content of the filling can be adjusted to 75 to 78 percent using corn and high fructose corn syrups. The viscosity of the filling was checked using a Bozwick viscometer. A viscosity of 6 to 10 is acceptable. The viscosity of the filling can be adjusted by increasing or decreasing the level of the pregelatinized tapioca starch. The filling was a heat-stable tasty filling having excellent texture, pleasant mouth-feel and superior preservative capability at normal room temperatures and above. The filling had a moisture content of 23 weight percent.

The fruit filling was put in a series of uncooked dough pastries as follows. Portions of the filling were placed on dough sheet so that a dough margin was left around the perimeter of each filling portion. Then the bottom dough sheet and the filling portions were covered with a top sheet of dough, which was already punctured with steam escape holes. All of the dough edges were sealed by crimping the dough edges to provide the necessary seal. Holes were then punctured in the upper surfaces. The uncooked pastries were cooked in an oven (with steam therein) at 365° F. for six minutes. The cooked pastries had a size of 4¼ inch in length, 3-1/32 inch in width and ⅜ inch in thickness, and had a count of 9¼ per pound. The cooked pastries had a water activity of 70 percent ERH maximum and a moisture content of 10 to 13 weight percent. The filling had acceptable flavor, texture and overall eating qualities.

After being air-tight packaged individually in a foil laminate, the cooked pastries were stored for six months. At the end of that period of time, the cooked pastries were still very edible and did not show any mold growth.

EXAMPLE 5

The Example illustrates the preparation of an apple pastry filling of the invention.

The following ingredients (Stage I) were placed in an upright low-shear mixer:

| Ingredients | Amounts |
| --- | --- |
| Apple Powder | 340 lbs. |
| Pregelatinized Tapioca Starch | 60 lbs. |
| Citric Acid | 9 lbs. |
| Dough Salt | 10 lbs. |
| Cinnamon | 4 lbs. |
| Sodium Benzoate | 2 lbs. |
| Nutmeg | 4 oz. |

The mixture was mixed for 5 minutes. The following ingredients (Stage II) were separately added:

| Ingredients | Amounts |
| --- | --- |
| High Dextrose Corn Syrup | 885 lbs. |
| High Fructose Corn Syrup | 730 lbs. |
| Glycerin | 115 lbs. |
| Concentrated Apple Juice | 35 lbs. |
| Apple Flavor | 25 lbs. |

The mixture was mixed for 15 minutes. The filling had a weight of 2,215 pounds 4 ounces. Before the filling was removed from the mixer, the viscosity and the soluble solids of the filling were checked. As needed, the soluble solids content of the filling can be adjusted to 75 to 78 percent using corn and high fructose corn syrups. The viscosity of the filling was checked using a Bozwick viscometer. A viscosity of 6 to 10 is acceptable. The viscosity of the filling can be adjusted by increasing or decreasing the level of the pregelatinized tapioca starch. The filling was a heat-stable tasty filling having excellent texture, pleasant mouth-feel and superior preservative capability at normal room temperature and above. The filling had a moisture content of 23 weight percent.

The fruit filling was put in a series of uncooked dough pastries as follows. Portions of the filling were placed on dough sheet so that a dough margin was left around the perimeter of each filling portion. Then the bottom dough sheet and the filling portions were covered with a top sheet of dough, which was already punctured with steam escape holes. All of the dough edges were sealed by crimping the dough edges to provide the necessary seal. The uncooked pastries were cooked in an oven (with steam therein) at 365° F. for six minutes. The cooked pastries had a size of 4¼ inch in length, 3-½₂ inch in width and ⅜ inch in thickness, and had a count of 9¼ per pound. The cooked pastries had a water activity of 70 percent ERH maximum and a moisture content of 10 to 13 weight percent. The filling had acceptable flavor, texture and overall eating qualities.

After being air-tight packaged individually in a foil laminate, the cooked pastries were stored for six months. At the end of that period of time, the cooked pastries were still very edible and did not show any mold growth.

A sugar icing topping can be applied to the uncooked pastries before they are cooked.

The mixing salt provided taste and stability, and should not be present in an amount greater than 0.75 weight percent or it will cause the filling to be too salty or sour. The citric acid is present for its taste effect and flavor enhancement, and should not be present in an amount greater than 0.75 percent. The pregelatinized tapioca starch is normally used in a range of 0 to 6 weight percent. The corn syrup is used to provide more sweetness and to help achieve good texture. The high fructose corn syrup provides a more stable filling and helps achieve a water activity of less than 0.7. The apple powder is critical and provides excellent results in the range of 14 to 18 weight percent. While apple powder is more expensive than pregelatinized tapioca starch, it reduces or eliminates the need for the use of pregelatinized tapioca starch while providing better results. Pregelatinized tapioca starch has been used for binding purposes, but it cannibalizes too much moisture which dries out the pastry. Such absorbed water cannot be removed from the filling. (The tapioca starch had to be pregelatinized or else the pastry has to be cooked too much.) Use a minimum of anything which binds water because it produces a gummy product. The taste of apple powder can be masked by the fruit and flavoring. The glycerine is used in an amount of 1 to 6 weight percent and prevents dryness in the baked portion. Propylene glycol or sorbitol can be used as the humectant, but they leave an aftertaste so glycerine is preferred.

By way of summary, the invention involves a heat-stable fruit filling having a high fructose content, a ratio of fructose to apple powder or over about 2:1 and substantially no granular sugars. It is essential in the invention that a corn syrup having high fructose content be used in combination with apple powder such that the ratio of fructose to apple powder is over about 2:1. The filling is designed to be incorporated within a pastry dough sheath or the like that can be baked, toasted or otherwise heated to produce a pastry product. Or in other words, the invention provides an improved fruit filling product which can be used in pies, cakes and pastries adapted for use in a toaster. The invention also involves a process for preparing the filling without the application of heat.

Although the enumerated examples illustrate various embodiments for practicing the invention, it should be understood that the invention is not limited thereto and that various changes and modifications may be made therein without departing from the scope of the invention.

What is claimed is:

1. Edible heat-stable fruit filling for incorporation within a pastry dough sheath comprising:
   (a) about 60 to about 76 weight percent of corn syrup containing a substantial amount of fructose;
   (b) about 10 to about 18 weight percent of apple powder;
   (c) about 2 to about 7 weight percent of pregelatinized tapioca starch; and
   (d) the remainder being at least one fruit in concentrated juice or concentrated puree form, the weight ratios of said corn syrup, said apple powder, said pregelatinized tapioca starch and said fruit being such as to provide heat resistance to the fruit filling and to provide stability to the filling, "the weight ratio of said corn syrup to said apple powder being between about 3 to 1 and about 7 to 1, the weight ratio of said corn syrup to said apple powder being between about 4.5 to 1 and about 6.5 to 1, the weight ratio of said apple powder to said pregelatinized tapioca starch being between 2:1 and 6:1, the fruit filling having an equilibrium relative humidity of 70 percent or less, the fruit filling having a moisture content of about 22 to about 25 weight percent of water, the fruit filling having a soluble solids content of 73 to 80 weight percent, and the fruit filling not containing any crystalline sugar or containing only up to 5 weight percent of sugar.

2. The fruit filling as claimed in claim 1 wherein said corn syrup is a corn syrup having a high dextrose equivalents value.

3. The fruit filling as claimed in claim 1 wherein said corn syrup is a high fructose corn syrup.

4. The fruit filling as claimed in claim 1 wherein said corn syrup is a corn syrup having a high dextrose equivalents value and a high fructose corn syrup.

5. The fruit filling as claimed in claim 1 wherein said corn syrup is a corn syrup containing at least 70 weight percent of fructose.

6. The fruit filling as claimed in claim 1 wherein about 63 to about 74 weight percent of said corn syrup and about 11 to about 15 weight percent of said apple powder are present.

7. The fruit filling as claimed in claim 1 wherein said apple powder has a particle size of 20 mesh.

8. The fruit filling as claimed in claim 1 wherein about 1 to about 12 weight percent of said concentrated fruit juice or said fruit puree is present.

9. The fruit filling as claimed in claim 1 wherein at least one acidifying agent is also present.

10. The fruit filling as claimed in claim 9 wherein water, sodium chloride, at least one flavorant and at least one preservative are also present.

11. Process for preparing an edible heat-stable fruit filling for inclusion within a pastry dough sheath comprising admixing about 60 to about 76 weight percent of corn syrup containing a substantial amount of fructose, about 10 to about 18 weight percent of apple powder, about 2 to about 7 weight percent of pregelatinized tapioca starch, and the remainder being at least one fruit in concentrated juice or concentrated puree form, the weight ratio of said corn syrup, said apple powder, said pregelatinized tapioca starch and said fruit being such as to provide heat resistance to the fruit filling and to provide stability to the filling, said admixing step being conducted without the application of heat the weight ratio of said corn syrup to said apple powder being between about 3 to 1 and about 7 to 1, the weight ratio of said corn syrup to said apple powder being between about 4.5 to 1 and about 6.5 to 1, weight weight ratio of said apple powder to said pregelatinized tapioca starch being between 2:1 and 6:1, the fruit filling having an equilibrium relative humidity of 70 percent or less, the fruit filling having a moisture content of about 22 to about 25 weight percent of water, the fruit filling having a soluble solids content of 73 to 80 weight percent, and the fruit filling not containing any crystalline sugar or containing only up to 5 weight percent of sugar.

12. The process as claimed in claim 11 wherein said corn syrup and said first are added to said pregelatinized tapioca starch and said the apple powder, and the resultant mixture is then admixed.

13. Cooked pastry product containing an edible heat-stable fruit filling comprising:
   (a) a cooked pastry sheath having a cereal flour base;
   (b) an edible heat-stable fruit filling contained within the cooked pastry sheath, the edible heat-stable fruit filling comprising:
      (i) about 60 to about 76 weight percent of corn syrup containing a substantial amount of fructose;
      (ii) about 10 to about 18 weight percent of apple powder;
      (iii) about 2 to about 7 weight percent of pregelatinized tapioca starch; and
      (iv) the remainder being at least one fruit in concentrated juice or concentrated puree form, the weight ratios of said corn syrup, said apple powder, said pregelatinized tapioca starch and said fruit being such as to provide heat resistance to the fruit filling and to provide stability to the filling, the weight ratio of said corn syrup to said apple powder being between about 3 to 1 and about 7 to 1, the weight ratio of said corn syrup to said apple powder being between about 4.5 to 1 and about 6.5 to 1, the weight ratio of said apple powder to said pregelatinized tapioca starch being between 2:1 and 6:1, the fruit filling having an equilibrium relative humidity of 70 percent or less, the fruit filling having a moisture content of about 22 to about 25 weight percent of water, the fruit filling having a soluble solids content of 73 to 80 weight percent, the fruit filling not containing any crystalline sugar or containing only up to 5 weight percent of sugar, the cooked pastry product having a moisture content of about 10 to about 13 weight percent of water, and the cooked pastry product having an equilibrium relative humidity of 70 percent or less.

14. The cooked pastry product as claimed in claim 13 wherein said corn syrup is a corn syrup having a high dextrose equivalents value.

15. The cooked pastry product as claimed in claim 13 wherein said corn syrup is a high fructose corn syrup.

16. The cooked pastry product as claimed in claim 13 wherein said corn syrup is a corn syrup having a high dextrose equivalents value and a high fructose corn syrup.

17. The cooked pastry product as claimed in claim 13 wherein said corn syrup is used in the form of a corn syrup containing at least 70 weight percent of fructose.

18. The cooked pastry product as claimed in claim 13 wherein about 63 to about 74 weight percent of said corn syrup and about 11 to about 15 weight percent of said apple powder are present.

19. The cooked pastry as claimed in claim 13 wherein at least one acidifying agent is also present in the fruit filling.

20. The cooked pastry product as claimed in claim 19 wherein water, sodium chloride, at least one flavorant and at least one preservative are also present in the fruit filling.

21. Toaster product adapted to be packaged in a substantially moisture-proof and airtight, a substantially baked, food-filled dough product comprising a continuous dough crust containing therein an edible heat-stable fruit filling, the fruit filling comprising:
   (a) about 60 to about 76 weight percent of corn syrup containing a substantial amount of fructose;
   (b) about 10 to about 18 weight percent of apple powder;
   (c) about 2 to about 7 weight percent of pregelatinized tapioca starch; and
   (d) the remainder being at least one fruit in concentrated juice or concentrated puree form, the weight ratios of said corn syrup, said apple powder, said pregelatinized tapioca starch and said fruit being such as to provide heat resistance to the fruit filing and to provide stability to the filling, the weight ratio of said corn syrup to said apple powder being between about 3 to 1 and about 7 to 1, the weight ratio of said corn syrup to said apple powder being between about 4.5 to 1 and about 6.5 to 1, the weight ratio of said apple powder to said pregelatinized tapioca starch being between 2:1 and 6:1, the fruit filling having an equilibrium relative humidity of 70 percent or less, the fruit filling having a moisture content of about 22 to about 25 weight percent of water, the fruit filling having a soluble solids content of 73 to 80 weight percent, the fruit filling not containing any crystalline sugar or containing only up to 5 weight percent of sugar, the toaster product having a moisture content of about 10 to about 13 weight percent of water, and cooked pastry product having an equilibrium relative humidity of 70 percent or less.

22. The toaster product as claimed in claim 21 wherein said corn syrup is a corn syrup having a high dextrose equivalents value.

23. The toaster product as claimed in claim 21 wherein said corn syrup is a corn syrup having a high fructose corn syrup.

24. The toaster product as claimed in claim 21 wherein said corn syrup is a corn syrup having a high dextrose equivalents value and a high fructose corn syrup.

25. The toaster product as claimed in claim 21 wherein said corn syrup is used in the form of a corn syrup containing at least 70 percent of fructose.

26. The toaster products as claimed in claim 21 wherein the toaster product has a moisture content of about 10 to about 13 percent of water.

27. Edible heat-stable, brown sugar, cinnamon filling for incorporation within a pastry dough sheath comprising:
   (a) about 60 to about 76 weight percent of corn syrup containing a substantial amount of fructose;
   (b) about 10 to about 18 weight percent of apple powder;
   (c) about 2 to about 7 weight percent of pregelatinized tapioca starch; and
   (d) the remainder being from sugar and cinnamon, the weight ratios of said corn syrup, said apple powder, said pregelatinized tapioca starch and the combination of said brown sugar and said cinnamon being such as to provide heat resistance to the filling and to provide stability to the filling, the weight ratio of said corn syrup to said apple powder being between about 3 to 1 and about 7 to 1, the weight ratio of said corn syrup to said apple powder being between about 4.5 to 1 and about 6.5 to 1, the weight ratio of said apple powder to said pregelatinized tapioca starch being between 2:1 to 6:1, the filling having an equilibrium relative humidity of 70 percent or less, the filling having a moisture content of about 22 to about 25 weight percent of water, th filling having a soluble solids content of 73 to 80 weight percent, and the filling containing only up to 5 weight percent of sugar.

28. Process for preparing the edible, heat-stable, brown sugar, cinnamon filling of claim 27 for inclusion within a pastry dough sheath comprising admixing about 60 to about 76 weight percent of corn syrup containing a substantial amount of fructose, about 10 to about 18 weight percent of apple powder, about 2 to about 7 weight percent of pregelatinized tapioca starch, and the remainder being brown sugar and cinnamon, the weight ratio of said corn syrup, said apple powder, said pregelatinized tapioca starch and said brown sugar and cinnamon being such as to provide heat resistance to the filling and to provide stability to the filling, said admixing step being conducted without the application of heat, the weight ratio of said corn syrup to said apple powder being between about 3 to 1 and about 7 to 1, the weight ratio of said corn syrup to said apple powder being between about 4.5 to 1 and about 6.5 to 1, the ratio of said apple powder to said pregelatinized tapioca starch being between 2:1 and 6:1, the filling having an equilibrium relative humidity of 70 percent or less, the filling having a moisture content of about 22 to about 25 weight percent of water, the filling having a soluble solids content of 73 to 80 weight percent, and the filling containing only up to 5 weight percent of sugar.

29. A cooked pastry product containing an edible, heat-stable, brown sugar, cinnamon filling comprising:
   (a) a cooked pastry sheath having a cereal flour base; and
   (b) the edible, heat-stable, brown sugar, cinnamon filling of claim 27 contained within the cooked pastry sheath.

30. A toaster product adapted to be packaged in a substantially moisture-proof and airtight package, a substantially baked, food-filled dough product comprising a continuous dough crust containing therein the edible, heat-stable, brown sugar, cinnamon filling of claim 27.

* * * * *

UNITED STATES PATENT OFFICE   Page 1 of 2
CERTIFICATE OF CORRECTION

Patent No. 4,562,080    Dated December 31, 1985

Inventor(s) Faozy E. Tenn

It is certified that error appears in the above-identified patent and that said Letters Patent are hereby corrected as shown below:

In Claim 1, at column 20, line 10 delete the beginning quote mark (") appearing immediately before the recitation "the weight".

In Claim 11, at column 20, line 61 immediately after the recitation "heat" insert a comma.

In each of the following Claims at the indicated place delete each recitation "the weight ratio of said corn syrup to said apple powder being between about 4.5 to 1 and about 6.5 to 1,":

| Claim | Column, lines |
|-------|---------------|
| 1     | 20, 12 - 14   |
| 11    | 20, 63 - 65   |
| 13    | 21, 31 - 33   |
| 21    | 22, 21 - 23   |

UNITED STATES PATENT AND TRADEMARK OFFICE
CERTIFICATE OF CORRECTION

PATENT NO. : 4,562,080　　　　　　　　　　Page 2 of 2
DATED　　　 : December 31, 1985
INVENTOR(S) : Faozy E. Tenn It is certified that error appears in the above-identified patent and that said Letters Patent is hereby corrected as shown below:

| Claim | Column, lines |
|-------|---------------|
| 27    | 23, 1 - 3     |
| 28    | 24, 1 - 3.    |

Signed and Sealed this

Twenty-fourth Day of March, 1987

*Attest:*

DONALD J. QUIGG

*Attesting Officer*　　*Commissioner of Patents and Trademarks*